United States Patent [19]

Duriez et al.

[11] 4,101,013
[45] Jul. 18, 1978

[54] PROCESS FOR THE CONTROL AND REGULATION OF THE SPEED OF A MOBILE

[76] Inventors: Jean Duriez, 119 rue J. Gielee 59000, Lille; Jean Evin, Hameau de la Becque 59710, Avelin, both of France

[21] Appl. No.: 758,901

[22] Filed: Jan. 12, 1977

[30] Foreign Application Priority Data

Jan. 15, 1976 [FR] France .................................. 76 01492

[51] Int. Cl.² .............................................. B66B 1/30
[52] U.S. Cl. .................................... 187/29 R; 318/227
[58] Field of Search ............. 189/27 R; 318/227, 230, 318/231

[56] References Cited

U.S. PATENT DOCUMENTS 3,759,350  9/1973  Caputo et al. ...................... 189/27 R
3,783,974  1/1974  Gilbert et al. ...................... 189/27 R Primary Examiner—Herman J. Hohauser
Attorney, Agent, or Firm—Cameron, Kerkam, Sutton, Stowell & Stowell

[57] ABSTRACT

The speed of an elevator is controlled and adjusted by utilizing a differential voltage obtained from a variable voltage indicating actual speed and a control voltage reflecting an ideal curve of speed variation. The resulting voltage or reference curve has a series of straight sections corresponding to distance lengths decoded from a distance counter for the distance travelled from the giving of a slowing order at a fixed distance from the stopping point. Each control section has it origin realigned with the reference curve.

9 Claims, 16 Drawing Figures

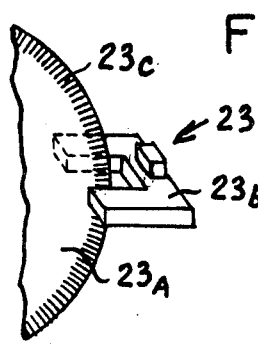
Fig._1
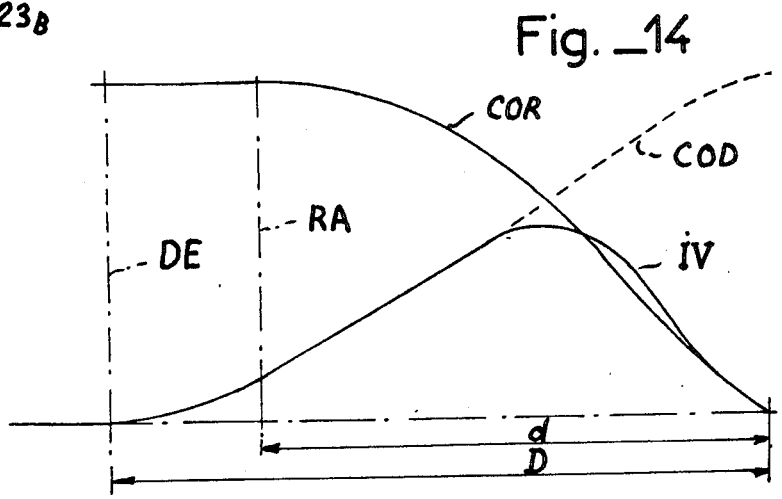
Fig._14
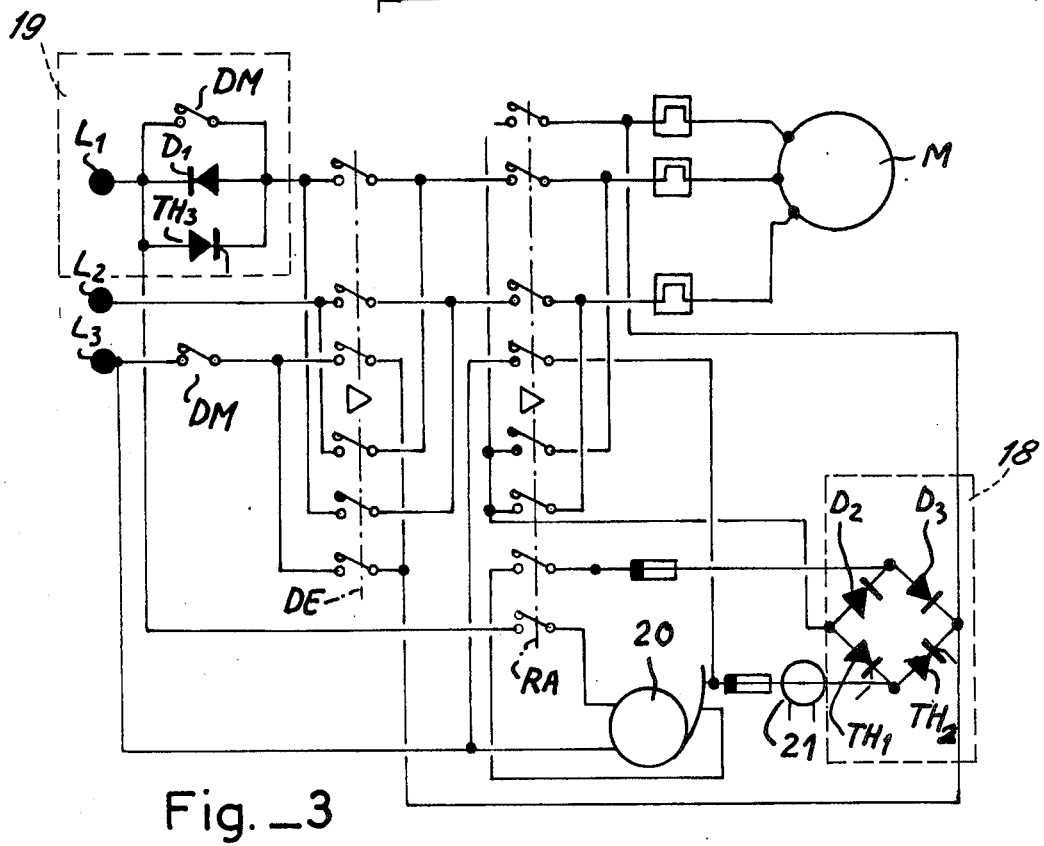
Fig._3

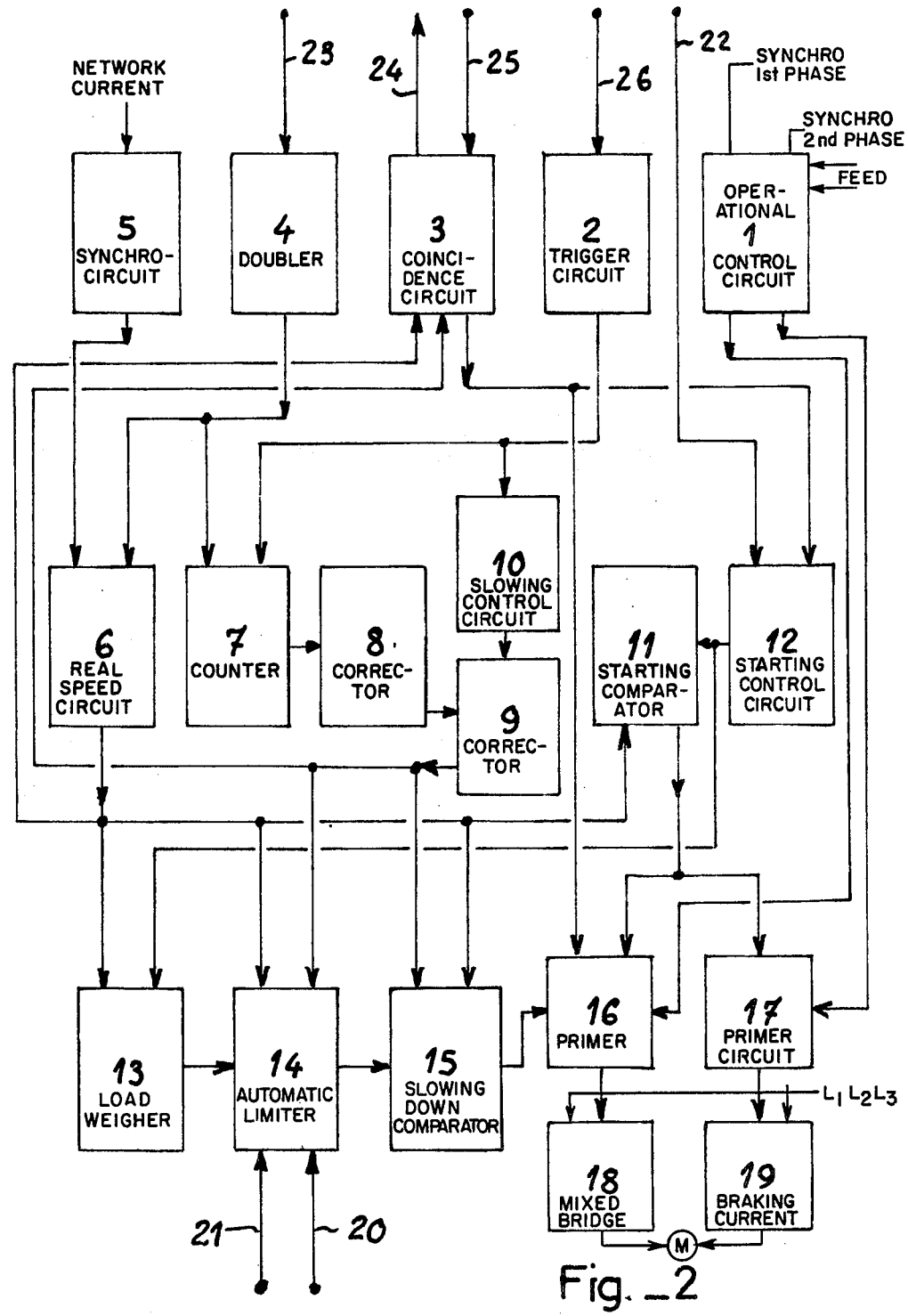
Fig._2

Fig. _4
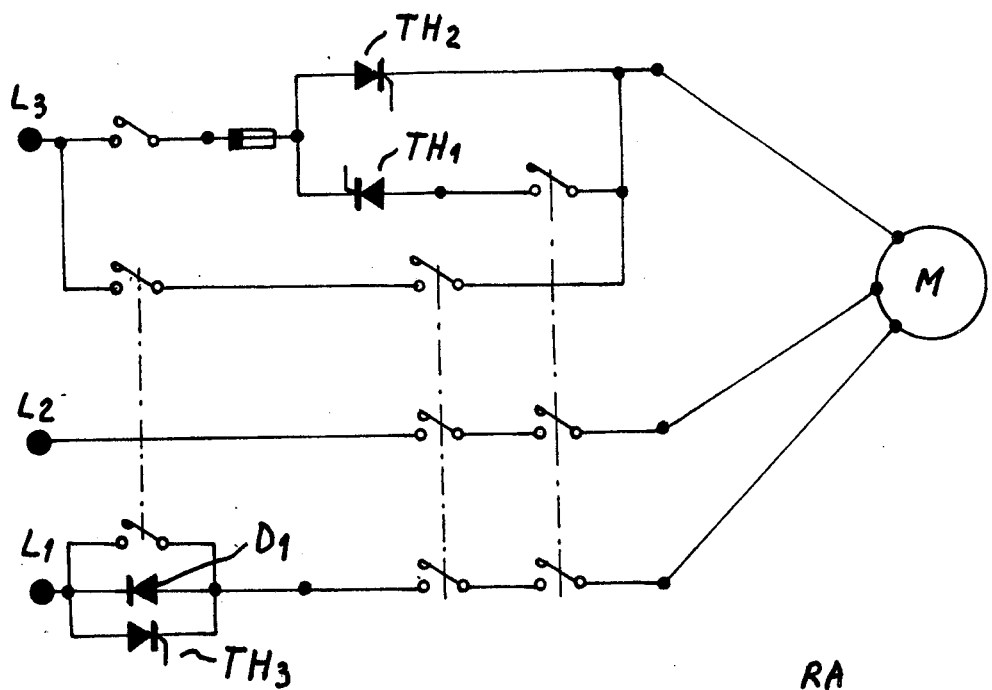
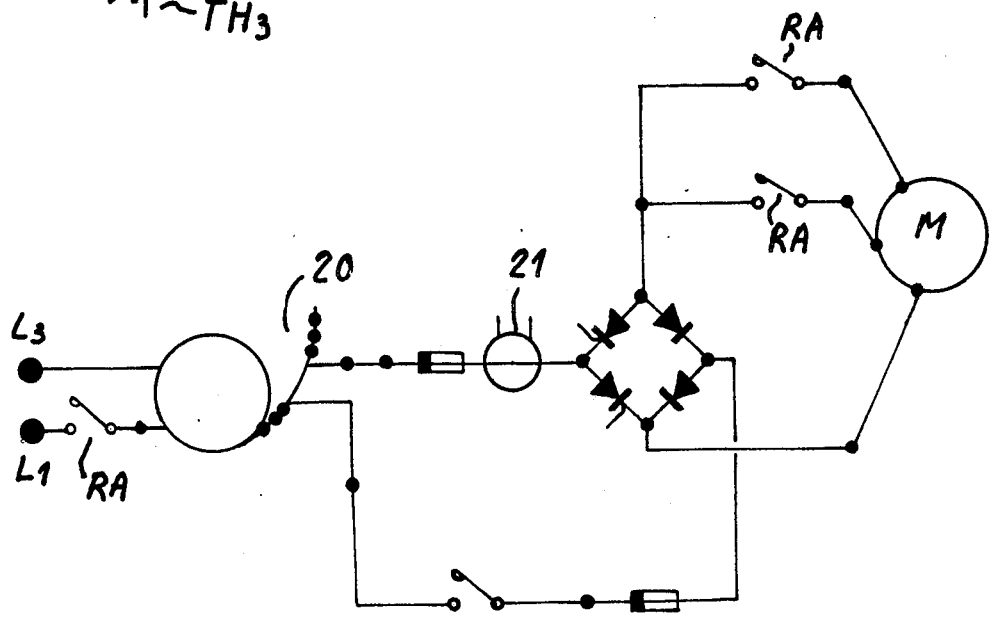
Fig. _5

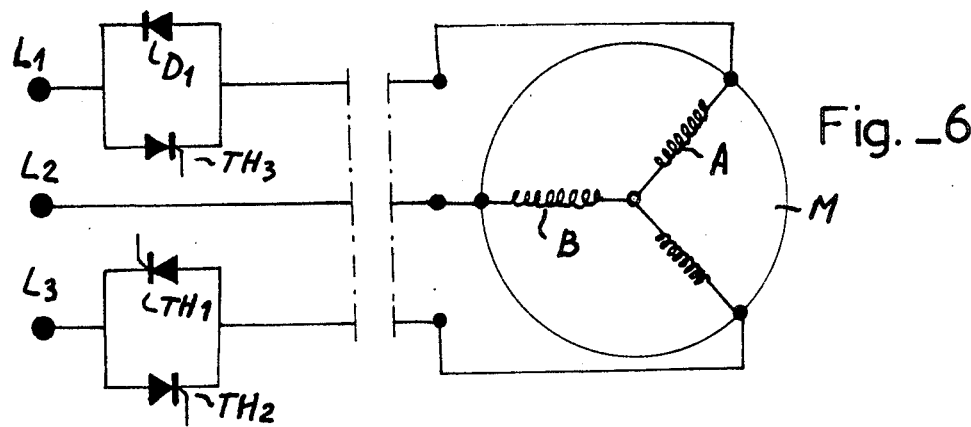
Fig. _6
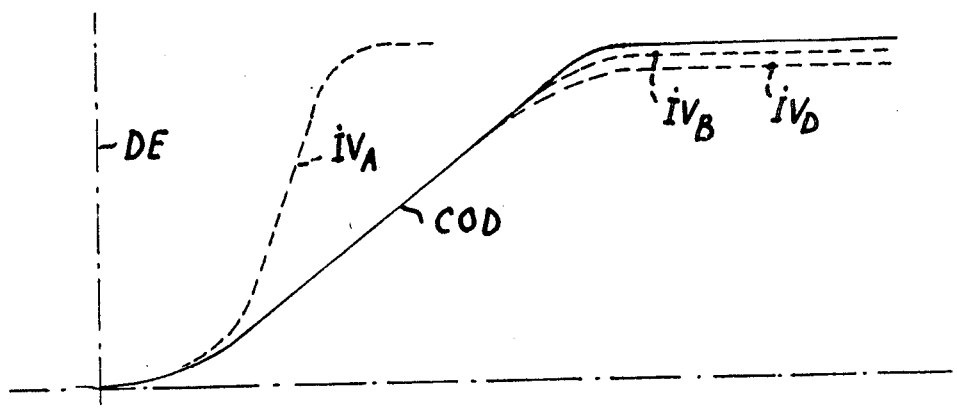
Fig. _7
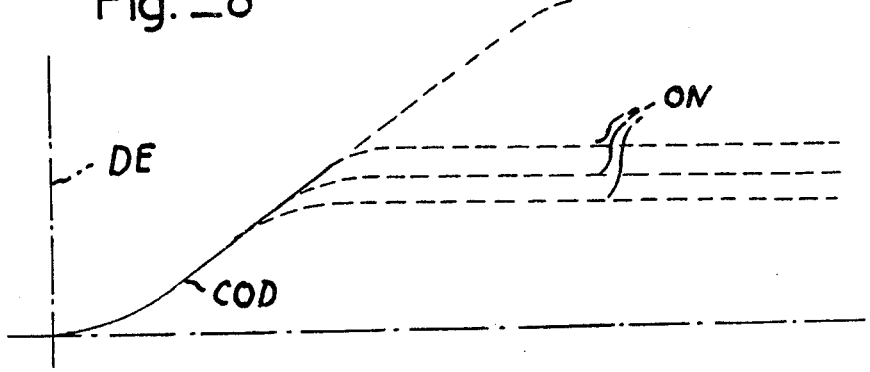
Fig. _8

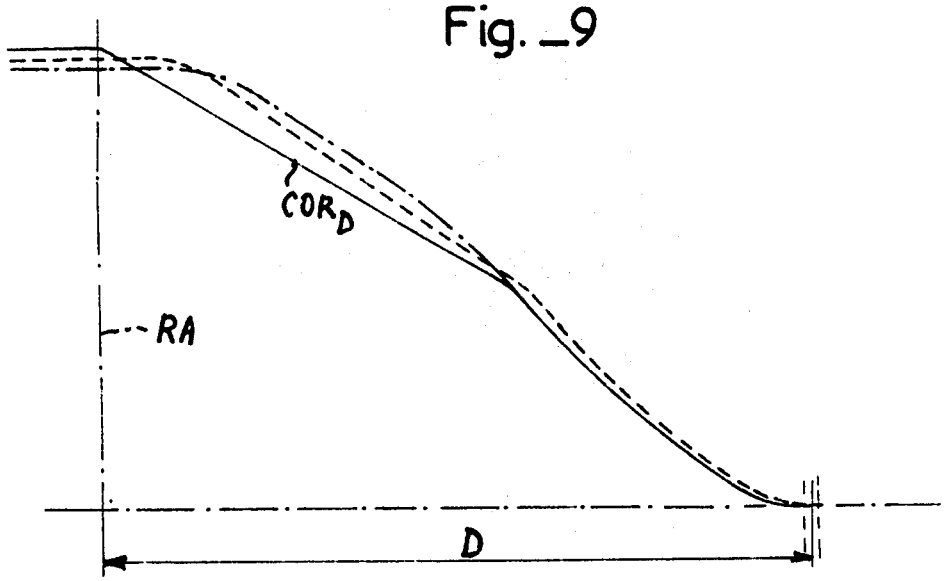
Fig. _9
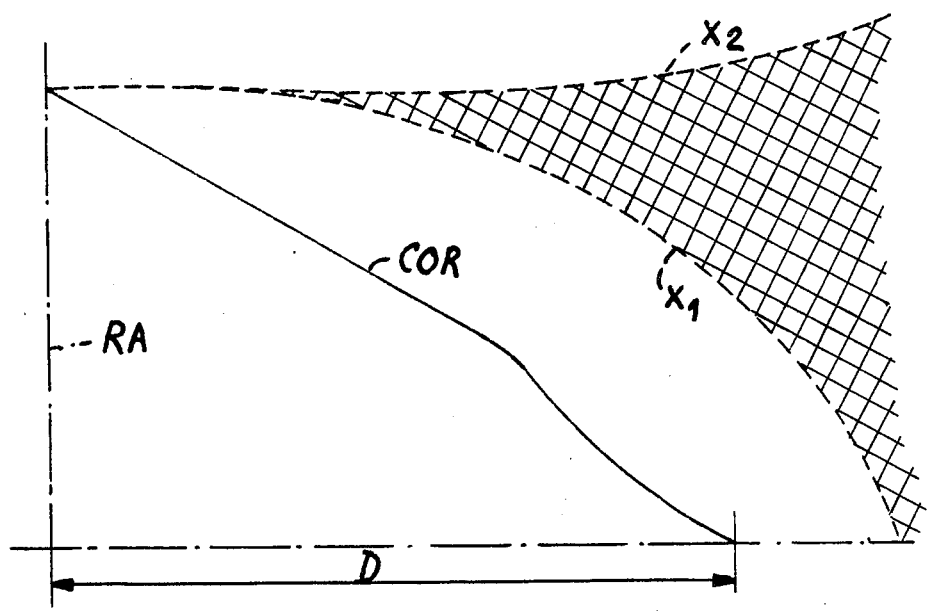
Fig. _10

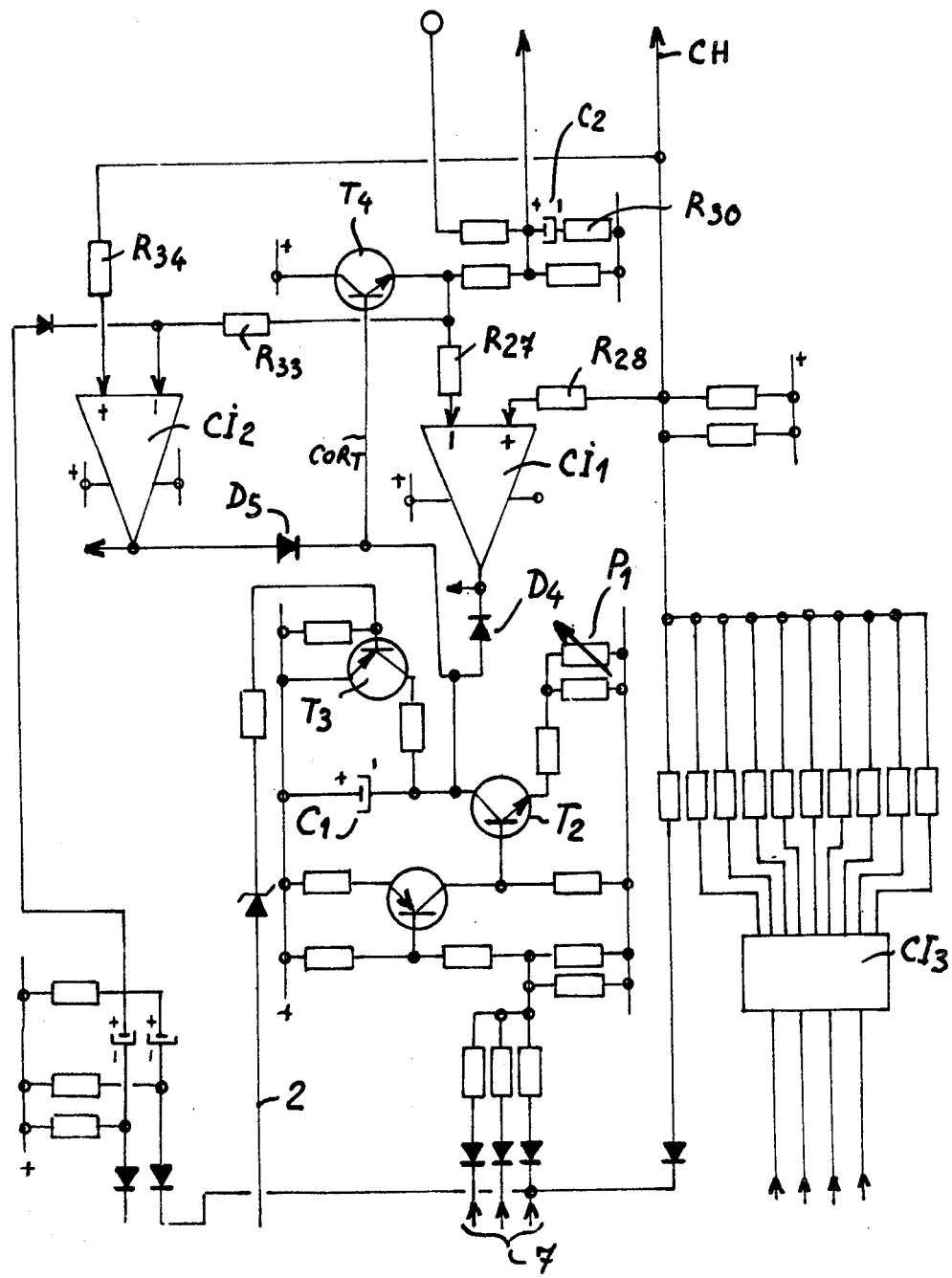
Fig. _11

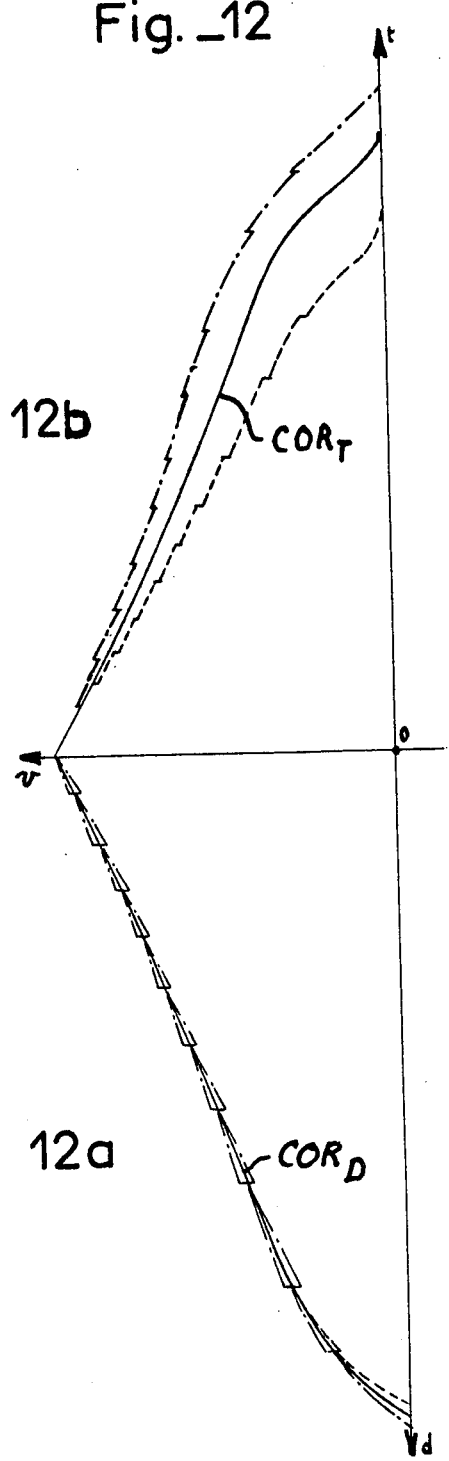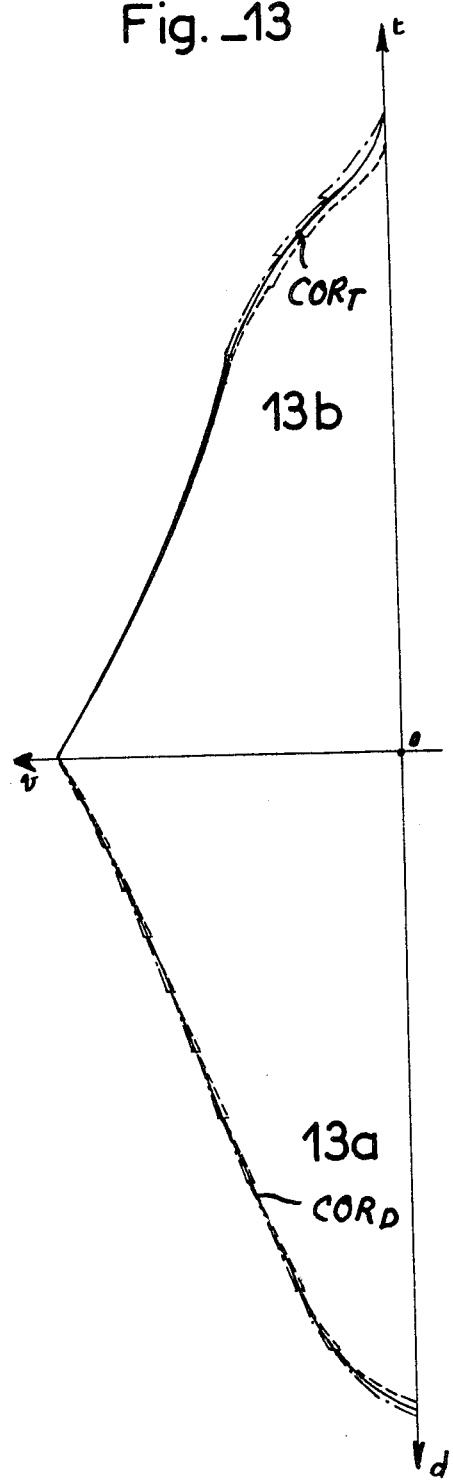

PROCESS FOR THE CONTROL AND REGULATION OF THE SPEED OF A MOBILE

This invention relates to a method for controlling the speed of a mobile. It is applicable more particularly but not exclusively to lifts and similar apparatus.

It would be understood that, in addition to the control of the variation of the speed of the mobile during starting and stopping, such a mobile must stop comfortably and accurately.

In the case of a lift, when there are a large number of floors to be served, the traffic generally requires a high speed and, to this end, it is currently known to use variable speed motors controlled in accordance with a predetermined reference curve (prescribed value) generally drawn against time which allows to achieve comfortable stop in the most favourable case of a descent under load, or of an upwards movement of no load. In this case, the apparatus stops according to the set time and therefore distance. In all the other cases, the inevitable departure from the expected actual speed causes a departure from the expected distance. To overcome this, the device must therefore continue to supply the motor which then runs at low speed until information is received which indicates that the required distance has been travelled.

This movement at low speed, which can last for a few seconds, tends to cancel the advantages of a high speed installation.

In a known variant, this disadvantage is alleviated by the use of large screens providing information proportional to the approach speed and allowing a compensating action to be taken before stopping. The solution which is technically satisfactory involves the use of complex machinery both in itself and in the lift installation.

In another known variant, the reference or prescribed slowing down value is obtained from a curve devided into several segments whose limits correspond to different positions previously decoded from a counter of the available distance. Each segment has a gradient different from the others in order to follow a reference curve corresponding, for example, to the speed at half-load.

Unfortunately, as the time separating each decoding is variable as a function of the speed, it follows that, each segment of the reference curve has a variable duration and the errors accumulate, in accordance with the load or the direction of displacement.

In another variant of the control device, the compensation action is the result of a time integration which has the same disadvantages indicated above, but in addition, it is much more complex and is very expensive.

Briefly, the ennumeration of the means used up to now shows that, besides a slowing down order given at a fixed distance from the stop point, further information indicating that the stopping distance is almost travelled is indispenable.

On the other hand, in the known means, notwithstanding their complexity, the reference curve comprises a single curve successively for starting, travelling at uniform speed, and slowing down with no comparison between the section serving for starting and that serving for slowing down. Accordingly, it is impossible to serve a number of intermediate levels too close to a preceding level in order to start slowing down of the mobile when the latter has gained sufficient speed.

When the levels are less numerous and the traffic is less intense, use is made of three-phase motors operating at one, two and even three speeds.

With single-speed motors, there is employed a brake to slow down and to stop a mobile. Braking members always wear off to a large extent and unevenly in the case of unbalanced loads.

With several-speed motors, braking occurs at slower speed, and accuracy and comfort are better, but passing from one speed to another involves further comfort problems.

Notwithstanding slowing down problems, nothing effective is used at present to remedy racing of the motor during starting with a light load or to attain, during maintenance of the apparatus, a low speed without employing a multi-speed motor.

An object of the present invention is to provide a method of and a device for controlling and adjusting the speed of a mobile by monitoring speed-variation control means by means of a differential voltage resulting from comparison of a voltage, whose variation indicates the evolution of the actual speed of the mobile, with a voltage, called control voltage below, which tends to follow an ideal curve of speed variation, such a voltage being called reference curve below, and is in the form of a succession of straight sections having a length corresponding, at least in the case of a stopping control, to the distance lengths obtained by decoding certain positions of a counter from the entire distance travelled since when the slowing down order was given at a fixed distance from the stopping point.

The invention is mainly characterized in that each control section has its origin realigned with the reference curve.

The invention will be better understood from the following description given by way of example with reference to the accompanying drawings in which:

FIG. 1 shows an element of the means for computing the distance travelled;

FIG. 2 is a block diagram of the device according to the invention;

FIG. 3 shows a power circuit;

FIG. 4 shows the power circuit during starting;

FIG. 5 shows the power circuit during slowing down;

FIG. 6 shows the essential components of the power circuit;

FIG. 7 shows the starting control curve;

FIG. 8 shows the inspection speed control curve;

FIG. 9 shows the slowing down control curve;

FIG. 10 shows the slowing down control curve at the region where the speed curves of the mobile are situated when the mobile is subjected only to inertia forces;

FIG. 11 is the wiring diagram of the corrector of the control curve against time and distance;

FIG. 12a shows the real-speed curves for various loads during slowing down, against distance;

FIG. 12b shows real speed curves for various loads during slowing down against time;

FIGS. 13a and 13b show real speed curves in the conditions set forth in connection with FIG. 12a and 12b, but when an additional corrector is provided which operates as a function of the load;

FIG. 14 shows starting and slowing down control curves in the case of a short distance between the starting point and the stopping point.

For a better understanding of the invention, it should be noted that, when an imaginary curve representing the ideal speed of a mobile, which is determined as a function of the time to avoid uncomfortable accelerations and decelerations, is compared with the curve representing its real speed, each departure from the two curves at a given instant is clearly representative of a difference between the two speeds, which results, since the time is the same, in a difference between the distance actually travelled and the distance which should have been travelled.

Such a difference is incompatible with the stopping accuracy of a lift and makes it necessary to abruptly brake or to drive the mobile at low speed in order to correct this defect.

The inventors have found that:

on the one hand, the imaginary curve of the ideal speed determines a fixed distance covered in a given zone, and thus, although the abscissae indicate the time, it is possible to divide the abscissae into sections corresponding to predetermined distances and to read in the ordinates the ideal speeds at which the mobile should travel along each section;

on the other hand, division of the real speed curve into corresponding sections could be the result of fixing a number of positions of a counter of the distance actually travelled, this also making it possible to read the real speed upon each change of section.

By comparing this real speed upon each change of distance section with the speed the mobile should have at that point according to the ideal curve, one knows the error involved and steps can be taken to correct the orders given to the means which determine the speed of the mobile.

In this way, without using expensive and complex means, the control curve against time is corrected as a function of distance, and upon each change of the distance section, the control curve is realigned with the ideal speed curve, thereby avoiding that differences in speed in each section become accummulated, and thus the final distance error has no effect.

The accuracy of the system according to the invention permits to disregard information indicating the end of the course.

When a stopping order is given, the ideal slowing down curve is compared with the real speed curve which is separately construed, and it will be understood that if the real speed of the mobile has not reached yet that provided by the ideal curve, the read correction is then an acceleration and not a deceleration and this until the two curves increase.

Accordingly, the mobile travels at sufficient speed to reach its destination.

In this way, the motor does not need to be operated at low speed.

On the other hand, it is sufficient to provide an inspection ideal-speed curve and to substitute it, by means of a contactor for the ideal speed course during inspections, in order to obtain that comparison with the real speed gives corrections limiting the speed of the motor which can then only be a single-speed motor.

The motor will then rotate at a speed lower than its synchronization speed, which does not give rise to inconveniences if this occurs for a certain time largely sufficient for the inspection.

Clearly, the advantage of having a single-speed motor is to be found above all in its cost.

The above described means are more particularly, although not exclusively, suitable for a mobile equipped with an asynchronous motor which is braked, after the alternating current feeding it has been cut off, by supplying direct current directly to the windings of the motor, thereby obtaining a braking effect by eddy currents, which is known per se Moreover, the present invention provides an improvement in such a braking means, wherein elements supplying continuous braking current of variable intensity are also used, while not braking, for modulating the driving action.

This exclusive braking action has the advantage of preserving the mechanical brake which is then operated only for blocking purposes upon stopping or as an emergency brake.

An embodiment of the invention will be described below in more detail.

In the device according to the invention, external information on the distance is given by an assembly 23 comprising a toothed disc 23a (FIG. 1) which is keyed on the output shaft of the motor of the mobile, and a scanner 23b which is responsive to the passage of the teeth 23c of the disc.

At the input of the device, a signal generated by the scanner is amplified by a doubler 4. From the output of the doubler 4 the signal is applied to a counter 7 and to a circuit 6 which determines a diagram of the real speed or its instantaneous value.

A circuit 5 is parallel ensures synchronization with the network current of the circuit 6 which produces a diagram of the speed. At the output of the circuit 6 there is then available a variable signal as a function of the frequency of the information from the doubler 4, which corresponds to what a tachymeter dynamo mounted on the output shaft of the motor could provide. A trigger circuit 2 controlled by information from standard control means for a lift, triggers both the counter 7 and a circuit 10 which processes the slowing down control curve against time.

The counter 7 counts the information impulses generated by the doubler 4 and, by decoding, controls as a function of the distance a corrector 8 comprising in particular a number of adjustable resistors and a circuit effecting corrections as will be explained below.

Decoding permits to divide the available distance into a plurality of portions. Each portion corresponds to one of the resistors and is adjusted to provide a voltage so that the diagram illustrating this voltage takes the form of an ideal course produced by the circuit 10. A signal generated by the circuit 10 is applied to a circuit 9, thereby correcting the signal as a function of the distance owing to the action of the corrector 8. The signal is then applied to a slowing down comparator 15 where the signal is corrected again by an automatic limiter 14 the function of which is to collect and to synthesize the information from a load weighing device 13, a thermistor 20, a matching transformer and a transformer 21, for the intensity and the difference between the circuits 9 and 6. To this end, the load weighing device 13 is connected to the outputs of the circuit 6, of the real-speed diagram processing circuit, and of the starting control processing circuit 12, as will be explained below.

The output of the limiter 14 together with the output of the circuit 9 designed to correct the slowing down control curve against distance is compared with the speed diagram from the circuit 6 by the slowing down comparator 15.

The signal generated by the comparator 15 energizes a primer 16 whose output controls a mixed bridge 18 comprising thysistors TH 1 and TH 2, and diodes D2 and D3.

The circuit 12, which processes the starting control curve against time, is triggered upon starting by a coincidence circuit 3 which is a variant of the triggering circuit 2.

The output of the circuit 12 which processes the starting control curve is connected together with a starting comparator 11 to the output of the circuit 6 designed to process the speed curve. A signal from the comparator 11 is applied to the priming circuit 17 whose output is connected to the assembly 19 comprising a diode D1 and a thyristor TH 3 connected in series, as well as the primer 16 whose output is connected to the mixed bridge 18.

In the case of a short distance between the starting point and the stopping point, the coincidence circuit 3 receives the speed-image signal from the circuit 6, this signal being compared with the output of the circuit 9 which processes the slowing down control curve corrected as a function of the distance so as to keep the mobile at high speed by means of a control 24 as will be explained below.

Moreover, the circuit 12 designed to process the starting control is influenced by a control 22 from a standard cabinet in order to provide a reduced speed control which is called inspection control.

The circuit 1 comprises members ensuring good operational control of the various sequences, stabilized supply, and synchronization of starting and slowing down primers 15 and 17.

The coincidence circuit 3 is triggered by the circuit 25 during real passage either while slowing down when the trigger circuit 2 is not controlled by the circuit 26, or during an imaginary passage, as will be described below.

With reference to FIGS. 3 to 6, one will better understand the device designed to ensure comfortable starting either in unloaded or loaded conditions, as well as reduced speed and isolevelling under control of the regulation.

Starting regulation is needed in the case of a small load being lifted because the driving load of the counterweight races the motor M. The problem is the same during an ascent with no load at reduced speed.

Such a regulation is possible only if one disposes of a variable braking torque and of a drive torque which progressively neutralises the braking torque when it is no longer required. To do this, according to FIG. 6 and assuming that the thyristors TH 1, TH 2 and TH 3 are blocked, a continuous braking current flows through the windings A and B. The diode D1 becomes a mono-alteration rectifier for the alternating input current L1 and L2. Conversely, when the thysistors are opened or conducting, the diode D1 takes part in the restoration of the sector L1, L2, L3 on the motor and the braking torque changes to a drive torque. Accordingly there is obtained a variable torque permitting the use of a regulation, as a function of the conduction of the thyristors. FIG. 7 permits to compare, starting from the starting control curve COD, the speed curve corresponding to starting ascending with no load without regulation 1V-A, at starting under control of the regulation 1V-B and when starting ascending 1V-A with a load.

The difference between 1V-B and 1V-D corresponds to slippage of the motor as a function of the load.

FIG. 8 shows the curves ON which are the result of the action of the circuit 22 controlling the inspection reduced speed on the starting control curve COD. Instead of continuing its progression, it will be noted that it is stabilized at an adjustable intermediate value.

Finally, it will be noted that in FIG. 7 the starting control curve COD is S-shaped starting from a starting order given by the contactors DE and then reaches its maximum and stabilizes itself at a voltage value slightly higher than that of the speed diagram of an ascent 1V-B and 1V-D with no load so as to keep the thyristors fully opened once speed has been gained, and this until a timed contactor DM is closed, thereby directly supplying the motor (see FIG. 4). It is also the starting control curve COD which serves as a reference for the load weighing device as will be explained below.

Before developing the formation of the braking control curve, it should be pointed out that the braking method chosen in the example illustrated is effective only after the supply to the motor has been cut off and is needed only because the kinetic energy of the mobile would require a stopping distance longer than the imposed by the slowing down control curve COR.

This is easy to determine in lifts where inertia due to the suspended weights is small with respect to the rotation inertia of the motor, the pully of the brake, and the flywheel. With reference to FIG. 10, it will be noted that the mobile, when the motor is cut off and the brake is open, and if it is ascending overloaded, will have a speed curve X1 and will travel the shortest distance called unfavourable distance, whereas, if it is ascending empty, it will have a speed curve X2 and will travel the longest distance called favourable distance.

The slowing down control curve COR must extend to a slightly shorter distance than the unfavourable distance so as to dispose of a reserve of energy to be equilibrated by the braking action in order to modulate the latter.

It is possible to increase the unfavourable distance by increasing the weight of the flywheel to be able to prolonge the slowing down control curve COR, thereby ensuring good comfort.

In general, the unfavourable distance for lifts in equal to one and a half the distance travelled in a second. Choice of a sufficient slowing down distance to ensure confortable deceleration must also permit to keep a value of the order of one and a third the distance travelled in a second. In these conditions it is possible, for example, to comforably decelerate a lift moving at a speed of 2 meters per second between floors about three meters from one another.

The braking action then has not to equilibrate the entire inertia, but only the action of the above described reserve of energy.

At the beginning of slowing down, owing to the action of slowing down contactors RA, the circuit 12 for the starting control curve COD takes immediately its low starting value.

At the same time, the slowing down control curve CORD begins its descending length as illustrated in FIG. 9.

In order to obtain the control curve, a predetermined level of slowing down in determined as a function of the time CORT for equilibrated loads, or at a half-load. Its value is maximum at the beginning of slowing down and linearly decreases at first to terminate its decrease in the form of an inverted S. Its slope is adjustable as a function of the comfort aimed at.

Turning now to the construction of the slowing down control curve, its purpose is clearly to alleviate the disadvantages of the known devices referred to above, and this by transforming the slowing down control curve CORT issued by the circuit 10 against time into a control curve CORD against distance, produced by the circuit 9, by using a method which keeps error to a minimum.

To do this, there is employed a corrector 8. As shown in FIG. 2, information from the doubler 4 is sent to a counter 7 of variable capacity. Its capacity is adapted to a number of peaks as close as possible to double the number of the output impulses of the scanner 23 and corresponding to the chosen slowing down distance D.

The chosen distance is then divided into several positions (e.g. 10) by decoding certain positions of the counter 7.

With reference to FIG. 11, the circuits 8, 9 and 10, which besides the counter 7 ensure that the corrections are made, will be better understood.

A capacitor C1 is discharged by a transistor $T_3$ which is, in turn, controlled by the trigger circuit 2 when the apparatus is operating at high speed. The slowing down control curve CORT against time provided by the circuit 10 then has a maximum value which depends on its regulation at the high point. Upon receiving a slowing down control, the trigger circuit 2 changes its state, the transistor $T_3$ is blocked and the capacitor C1 is charged by a constant current by way of a generator formed by transistor $T_2$. The potentiometer P1 makes it possible to adjust the charging time of the capacitor C1 as a function of a chosen distance. Decoded positions of the counter 7 modify the slope inclination during deceleration so as to adapt the curve in the form of an inverse S the end as shown in FIG. 9. The rounded portion at the top of the curve is ensured by the action of the automatic limiter 14 as will be explained below. Although depending on the counter, the action of the limiter 14 has no effect on the stopping accuracy, it is solely directed to influence the shape of the slowing down curve and thus to affect comfort.

A decoder C13 receives information from the counter 7. Each decoded portion of distance corresponds to an adjustable divider bridge whose middle point is available on the output CH.

An operational amplifier CI 1 mounted in open loop compares the output voltage level CH, by way of the resistor R28, with the slowing down control curve COR and, negatively corrects, if necessary the level of the control curve by way of the resistor R 27 and the diode D4.

The operational amplifier CI2, mounted in the same way, compares the output voltage level CH by way of a resistor R 34 with the slowing down control curve COR and positively corrects, if necessary, the control level by way of the resistor R 33 and the diode D5. In order to keep the same chain of resistors in both cases, the comparator is energised only during the negative derivatives corresponding to a change in the position of what we call the reference control available on the output CH.

The controlled emitter T4 makes is possible to use a signal from the capacitor C1 after correction without altering the internal assembling. On the other hand, a capacitor C2 and a resistor R 30 make the end of the curve round. The result of this assembly will be better understood when reference is made to FIG. 12, knowing that the reference control is preadjusted on the ideal control curve CORD and that it is proportional to the distance chosen, while taking into account the variable-capacity counter, and that the control curve CORT against time produced by the circuit 10 is adjustable as described above, it will be noted that, when comparing the curves against time and against distance, the method has transformed the distance error into a time variation, which does not involve any problems.

On the other hand, it will be noted that the positive or negative corrections described above ensure realigning of the slowing down control curve COR with a precise value, with no possibility for the errors to be cumulated as happens in the known devices.

Finally, FIG. 13 makes is possible to better understand the usefulness of the automatic limiter and the load weighing device 13 which will be described below and, by reducing speed differences due to the load, reduces at the same time the importance of the required corrections.

In FIG. 13, a solid line indicates the half-load slowing down control curve CORT against time, which covers the points of the reference curve against distance without effecting any correction whereas, on the one hand, the dashed-line curve illustrates an ascent with a load or a descent with no load, and, on the other hand, the dotted-line curve represents an ascent with no load and a descent with a load.

In view of the stopping accuracy attainable by this device, it has been possible in an example where the toothed disc had two hundred teeth, the motor rotated at 25 r.p. second, and/or the chosen slowing down distance corresponded to ten thousand and seven hundred peaks to inform the primer 15 when 9700 peaks have passed, after which opening of the thyristors is progressively reduced down to a very small value required for electrical stabilization of the rotor before mechanical falling-in of the safety brake.

In this way, there is obtained a very comfortable final result. It should be noted that, to ensure accuracy, the stopping zone between a movement with no load and an idle movement ranges from 9730 to 9770 peaks, i.e. a difference of 40 peaks, which in the above illustrated example ensures a stopping tolerance of ± 3 mm in height.

This accuracy is more than sufficient for a lift. However, an improvement can be made by correspondingly increasing the number of decoded positions. Finally, the brake is controlled to fallin by eliminating the speed-image signal on the output of the circuit 6 after slight timing, and thus after complete stoppage of the apparatus.

On the other hand, total closing of the thyristors in the power circuit is simultaneously and electronically ensured upon reenergization of the contactors, which results in a reduction in their electrical wear bearing in mind that upon starting they stick when the starting control curve COD still has zero value.

Auxiliary devices 13, 14 have been added to the regulation assembly to increase comfort and stability. In particular, they act as a function of the load.

The device comprises an automatic limiter which receives information from the intensity transformer 21 (FIG. 3) connected in series to the alternating supply of the mixed bridge. The injection current then flows through its primary winding before being rectified and the voltage from its secondary winding is rectified and then filtered. Its value is proportional to the injection. It is put in opposition in the automatic limiter 14 to the said injection control to obtain an adjustable counter-reaction to limit injection.

The limiter 14 is also controlled by the electronic load-weighing device referred to above which effect dynamic measurements. To this end, the ratio between starting curve and image of the actual speed determined, being clearly proportional to the loads. In the favourable direction, i.e. during the ascent with no load, or during a descent with a load, there also occurs a slight over-speed. By comparing the starting control curve COD produced by the circuit 12 with the speed-image signal 1V generated by the circuit 6, there is obtained a variable value which is proportional to the difference between the reference and the real speed of the mobile. This information is stored in a memory and it is read during slowing down to control the automatic limiter 14 which will modulate the breaking action proportionally with the load as indicated by the load curve (dashed line) in FIG. 9. This results in a decrease of the speed variation between extreme loads.

In the case of intense traffic, the ohmic resistance of the windings of the injection transformer increases with the temperature. To compensate for the error resulting from the difference with the cool-made initial adjustment, the device comprises a thermistor 20 which also acts on the limiter, e.g. to proportionally increase opening of the thyristors in the mixed bridge.

In view of these various limitations of the slowing down action, it is expedient to utilize information determining the real departure of the speed-image curve 1V produced by the circuit 6 from the slowing down control curve CORD against distance produced by the circuit 9 so as to complete the synthesis.

This assembly comprises the automatic limiter 14 whose function is to control the injection into s, thereby ensuring that the speed of the mobile follows the slowing down control curve well with maximum comfort.

Up to now we have assumed that the lift had terminated its starting operation before beginning to slow down. In the case of a distance d between floors, which is shorter than the normal distance, it may happen that the slowing down order is given when the speed is still too low at the beginning of the starting operation. In such a case, the inertia forces would be insufficient to drive the mobile to its stopping point, bearing in mind that the motor must not normally be supplied again once slowing down has started.

To alleviate this disadvantage, a so-called coincidence device 3 imposes continuation of supply to the motor notwithstanding the order of slowing down, and this until the speed attained will enable storing sufficient kinetic energy to ensure that, simply by effect of inertia forces, the mobile reaches its stopping point under control of the regulation assembly.

FIG. 14 shows the starting DE and the slowing down control RA during acceleration. The trigger circuit 2 then changes its state and triggers the slowing down control curve COR which begins its sloping part under control of the corrector 8, while the starting control curve COD provided by the circuit 12 continues its progression, contrary to a normal sequence. The coincidence circuit 3 waits until the speed image has practically readjoined with the slowing down control curve COR before the slowing down sequence is allowed to take place.

In these conditions, one is sure to reach the stopping point because one is in the same conditions as those for a normal slowing down.

The automatic limiter ensures the formation of the round portion between the end of the starting procedure and the beginning of the slowing down procedure.

The advantages of this assembly are numerous. It permits upon starting suitable and comfortable regulation of an a.c. motor, and this both under loaded or unloaded conditions, with the possibility of reduced speed, for example for inspection and automatic leveling called "isoleveling".

Regulation based on the distance travelled ensures control of slowing down and comfortable stopping of the mobile.

An electromechanic switch permits to utilise the thyristors of the power circuit for the starting and slowing down procedures, notwithstanding that starting takes place with alternating current, and braking with continuous current.

Double utilization of the windings of the alternating current, single speed motor allows the motor to be used both as a motor and as an eddy-current brake.

Such a regulation utilizes only inertia as the sole energy opposed to the braking torque, which ensures continuous current injection without requiring any further feed to the motor after slowing down has started.

It is the elimination of the input signal of the counter 7 single speed motor allows the motor to be used both as a motor and as an eddy-current brake.

Such a regulation utilizes only inertia as the sole energy opposed to the braking torque, which ensures continuous current injection without requiring any further feed to the motor after slowing down has started.

It is the elimination of the input signal of the counter 7 which indicates that the distance has been travelled.

The signal from the scanner has a double use, i.e. on the one hand, it gives information on the real speed, and, on the other hand, it gives information on the distance travelled, by means of the counter.

If the slowing down curve is triggered before the mobile has attained its maximum speed, there occurs an imaginary intersection between the starting and slowing down curves, which is made possible because they are independent from one another. The mobile then travels a portion of the starting curve up to a point close to intersection and then will follow the slowing down curve. It is this which permits the mobile to normally stop in the case of closer floors.

The total result attained is comparable with that of the known apparatuses equipped with d.c. variable speed motors with a regulation called "Ward Loenard" but with a much more economic equipment.

As compared to apparatuses equipped with alternating motors, it will be clear that the use of multi-speed motors is no longer required, that the inertia forces utilized as explained above take part in providing comfort and are no longer a cause of wear of the mechanical brakes, that, likewise in "Waed Leonard" assemblies, soft beginning of slowing down and stopping considerably increases the duration life of the winches, that suitable control of the thyristors upon starting and stopping practically eliminates wear of the contractors.

The invention brings about a simplification in the required equipments with repect to the conventional devices. Of course, although the described embodiment has been applied to a given electromechanic assembly, it is applicable to other assemblies.

Similarly, the speed variation controlled by the circuit can be obtained by means other than braking by current injection into the motor. Such means for varying the speed of the mobile can also be interlocking of a variable speed motor and/or a braking device whose action is directly or indirectly a function of the characteristics of a current, e.g. an eddy-current retarder or an electromechanic brake.

We claim:

1. A method of controlling and regulating the speed of a mobile by monitoring means controlling the variation of speed the steps of generating a differential voltage by the comparison of a voltage whose variation represents the evolution of the real speed of the mobile with a control voltage which tends to follow a continuous ideal reference curve of speed variation, regularly correcting said reference curve by a corrector at lengths of distances obtained by decoding certain positions of a single programmable series counter counting the entire distance travelled after an order has been given at a fixed distance from the stopping point the improvement comprising realigning the origin of the step of each correction value with the reference curve.

2. A method as claimed in claim 1, including the further step of measuring the difference representing the actual error between the starting control curve and the speed image, during starting and utilizing this difference for actuating a braking means by a limiter upon slowing down.

3. A method as claimed in claim 1 including the steps of using the same controlled diodes to modulate the alternating current during starting and to obtain and to modulate the continuous current during slowing down by a commutation providing various coupling arrangements for replacement, after the slowing down order has been given, of the alternating current supply to a single-speed asynchronous motor with a continuous current supply.

4. A method as claimed in claim 3, including the further step to achieve maximum speed lower than the normal one of applying a speed control to cause the asynchronous motor to run at a speed lower than its synchronisation speed.

5. A method as claimed in claim 4, in which the control for varying the speed of the mobile is automatically limited, the steps of causing the automatice limitation according to the evolution of at least one of the values attained by a voltage proportional to such action and by the load and the difference between a predetermined value and the instantaneous speed upon slowing down and by a thermal control of the motor and a braking voltage generator.

6. A method as claimed in claim 1 utilizing two inependent curves, one for starting and the other for slowing the starting order can proceed its normal evolution, notwithstanding a request for deceleration intervenes before it has attained its maximum and a slowing down order is simultaneously given such an order being controlled by the corrector until the two curves coincide, thereby driving the mobile to its destination point notwithstanding possibly insufficient inertia at the moment when the slowing down order is given.

7. A device for controlling and regulating the speed of a mobile for monitoring means for controlling the speed variations by means of a differential voltage which is the result of a comparision of a voltage whose variation represents the evolution of the real speed of the mobile with a control voltage, said voltage tending to follow an ideal control curve of speed variation and comprising a succession of straight sections having lengths corresponding, at least in the case of a slowing down to complete stoppage order, to distances obtained by decoding certain positions of a counter counting the entire distance travelled after the order has been given at a fixed distance from the stopping point, the improvement comprising means for realigning the origin of each section with the reference curve.

8. A device as claimed in claim 7, including a load weighing device and means acting on the speed variation control means as a function of the differences between the real load and a load taken as a base during formation of the control curve.

9. A device as claimed in claim 7 including supplying means for an alternating current motor driving the mobile and means for supplying a continuous current to the motor for slowing down the motor.

* * * * *